United States Patent [19]
Van Roekel

[11] Patent Number: 6,127,969
[45] Date of Patent: Oct. 3, 2000

[54] NAVIGATION SYSTEM AND METHOD FOR OUTPUTTING DIRECTION INFORMATION FROM THE NAVIGATION SYSTEM

[75] Inventor: Jauke Van Roekel, Laufdorf, Germany

[73] Assignee: U.S. Philips Corporation, New York, N.Y.

[21] Appl. No.: 09/035,432

[22] Filed: Mar. 5, 1998

[30] Foreign Application Priority Data

Mar. 17, 1997 [DE] Germany .......................... 197 11 092

[51] Int. Cl.$^7$ .............................. H04B 7/185; G01S 5/02
[52] U.S. Cl. .................. 342/357.13; 340/995; 701/208; 701/211
[58] Field of Search ........................ 342/357.13, 357.01; 340/990, 995; 701/208, 211

[56] References Cited

U.S. PATENT DOCUMENTS

| | | | |
|---|---|---|---|
| 5,058,023 | 10/1991 | Kozikaro | 340/988 |
| 5,488,559 | 1/1996 | Seymour | 342/457 |
| 5,724,243 | 3/1998 | Westerlage et al. | 340/994 |
| 5,852,791 | 12/1998 | Sato et al. | 701/217 |

FOREIGN PATENT DOCUMENTS

0534533A1  3/1993  European Pat. Off. ........ G01C 21/20

Primary Examiner—Theodore M. Blum
Attorney, Agent, or Firm—Gregory L. Thorne

[57] ABSTRACT

The invention relates to a method for outputting direction information relating to a route planned by means of a navigation system.

In order to achieve simple and economical implementation of such a navigation system and to enable simple, reliable and unambiguous indication of direction information also in partly digitized areas, a first direction indication is provided for indicating the direct direction from an instantaneous vehicle position to a remote point along the planned route, said remote point being situated a forward distance ahead of the instantaneous vehicle position and being continuously adapted in dependence on the vehicle position.

8 Claims, 5 Drawing Sheets

| roadtype | standard value for the forward distance |
|----------|----------------------------------------|
| A | 400m |
| B | 300m |
| C | 200m |
| D | 150m |
| E | 100m |
| F | 50m |
| G | 50m |

Fig.7

NAVIGATION SYSTEM AND METHOD FOR OUTPUTTING DIRECTION INFORMATION FROM THE NAVIGATION SYSTEM

BACKGROUND OF THE INVENTION

1. Field of the Invention

The invention relates to a method for outputting direction information relating to a route planned by means of a navigation system, and to a vehicle navigation system which includes an arithmetic circuit for calculating a route for determining the position of the vehicle by means of at least one sensor signal, and also includes an output device for outputting the direction information supplied by the arithmetic circuit.

2. Description of Related Art

Such a method for outputting direction information and such a navigation system are known, for example from EP 534 533 A1. According to the known method, the direction information is displayed in the form of abstracted representations of intersections. The display of the abstracted intersection representations is particularly suitable for fully digitized areas, i.e. for areas in which each individual road is stored in the map memory of the navigation system. This is notably the case for large cities. In many cases, however, small towns and rural areas are available only in partly digitized form in the map memory of the navigation system, which means that not every road in such an area is stored in the memory of the navigation system. At intersections or road junctions which are not stored in the memory of the navigation system, therefore, the driver of a vehicle equipped with such a navigation system may be confronted with uncertainties or ambiguities in respect of the route to be followed.

In the Philips navigation system CARIN, for example, in addition to the abstracted intersection representation there can, therefore, be displayed a map of the surrounding area which is intended notably for orientation in partly digitized areas. A high-resolution display screen is required so as to enable adequate display of such a map of the surrounding area.

SUMMARY OF THE INVENTION

It is an object of the invention to provide a method and a navigation system of the kind set forth which can be simply and inexpensively implemented and enable reliable, simple and unambiguous display of direction information also in only digitized areas.

This object is achieved by a method according to the invention in that there is provided a first path indication for indicating the direct direction from an instantaneous vehicle position to a remote point which is situated a forward distance therefrom along the planned route, and which is continuously adapted in dependence on the vehicle position.

The first direction indication thus serves to indicate the planned direction in the immediate vicinity of the instantaneous vehicle position. To this end, the direct path is indicated, i.e. the direction of a straight line from the relevant instantaneous vehicle position to a remote point which is situated on the route. The remote point lies ahead of the instantaneous vehicle position in the direction of travel and is situated at a relevant forward distance, i.e. the distance along the planned road or route, from the relevant instantaneous vehicle position. The remote point is shifted as the vehicle position changes during travel so that it is adapted to the vehicle position.

The remote point is preferably situated at a distance of from approximately 50 m to 500 m from the instantaneous vehicle position along the travel route planned.

The first direction indication enables, notably in partly digitized areas, continuous indication of the planned travel direction in the immediate vicinity. In the case of ambiguous intersections, the user can recognize the planned direction in one glance and continue travel in the correct direction. The first direction indication offers the driver continuous direction information even in the absence of active instructions, for example an instruction to turn off at an intersection.

The first direction indication can be very simply implemented, for example as a straight arrow or a compass needle. Therefore, the first direction indication can also be realized on simple displays, or display screens, for example on monochrome display screens.

A preferred version of the method according to the invention is characterized in that the forward distance can be varied.

Variation of the forward distance enables adaptation of the forward distance to various parameters, for example vehicle parameters, parameters of the surroundings, and road parameters, thus optimizing the first direction indication for the user.

It is particularly attractive to increase the forward distance as the vehicle speed is higher. This increase can be performed continuously as well as intermittently. A speed-dependent variation of the forward distance enables the method to be carried out in such a manner that the vehicle always reaches the relevant remote point within essentially the same period of time.

This enables adaptation of the remote point to the field of view of the driver which changes as the speed of the vehicle changes. The faster a vehicle travels, the further ahead the driver will look. Via the speed-dependent variation of the forward distance, the remote point can thus be adapted to the field of view of the driver which corresponds to the relevant vehicle speed. For example, the tachometer of the vehicle can be used as a speed sensor.

The type of road is to be understood to mean the classification with which the individual roads are stored in the map memory of the navigation system. Types of classification are, for example motorways, federal highways, state highways, secondary roads and the like. The higher the expected average speed on the relevant type of road, preferably the longer the forward distance is chosen for this type of road. For example, a high average speed is to be expected on motorways and a motorway normally has few curves only. Therefore, a long forward distance is preferably chosen for motorways. On the other hand, a lower average speed, and also more curves, are to be expected for a small secondary road. Therefore, it is advantageous to choose a shorter forward distance for the secondary road type. It is particularly advantageous to provide a target value for the forward distance for the individual road types stored in the map memory of the navigation system and to vary this target value in dependence on the vehicle speed.

The optimum value of the forward distance is highly dependent on the relevant course of the road. It can be optimized, and hence also the relevant direction indication for the relevant road course, via the road-dependent variation of the forward distance. The forward distance is advantageously chosen to be comparatively small particularly for special curve geometries. This can be achieved by automatic adaptation of the forward distance in dependence on the course of the road.

For example, the relevant angle of the first direction indication can be stored in a memory at selectable intervals so as to be evaluated by means of an arithmetic circuit. If the angular difference between individual successive angles exceeds a selectable limit value, the forward distance will be automatically reduced.

A further possibility consists in evaluation of the course of the road between the instantaneous vehicle position and the instantaneous remote point. To this end, equidistant subsidiary remote points are defined over the forward distance between the instantaneous vehicle position and the instantaneous remote point, the relevant angle between the first direction indication and the instantaneous vehicle position being calculated at each of said subsidiary remote points. If the angular difference between these individual calculated angles exceeds a selectable limit value, the forward distance will be automatically reduced.

Another possibility consists in providing selectable forward distances for selectable intersection geometries. Upon detection of such selectable intersection geometries, the selectable forward distances for the first direction indication are then used for the passage through the relevant intersection. The recognition of the selectable intersection geometries can be performed, for example by means of a pattern recognition algorithm. It is also advantageous to vary the forward distance in dependence on the road conditions.

The road conditions are to be understood to mean herein, for example the roughness of the road surface. If the road is very uneven and bumpy, the driver will usually drive more slowly and reduce his or her field of view accordingly. Therefore, it is attractive to reduce the forward distance in the case of uneven road surfaces. The same holds when the road is slippery or icy.

A further attractive version of the method according to the invention is characterized in that the forward distance can be varied in dependence on the light and/or visibility conditions.

When the driver drives at night, his or her field of view will be restricted to the low-beam or high-beam illumination range of the headlights, and the forward distance can be adapted to this high-beam or low-beam range, so that the remote point is situated within the range of sight of the driver. Moreover, the forward distance can also be adapted to other limitations of the visibility, for example in the case of fog.

For example, photodiodes can be used as brightness sensors. The switch for the high beam and the low beam of the vehicle illumination can also be used as the brightness sensor and a selectable forward distance can be adjusted in dependence on whether the high beam, the low beam or no lights are switched on.

It is also possible to select a fixed value for the forward distance.

Such a fixed value enables a particularly simple implementation of the method. Such fixed values could be entered by the user, for example before the start of driving or when a vehicle is put into service.

A combination of the first and the second direction indication always offers the optimum direction indication in dependence on the map information available. The software of the relevant navigation system automatically recognizes whether the map information for the relevant vehicle position is available in partly digitized or fully digitized form. If the data is available in partly digitized form, preferably the first direction indication is activated whereas the second direction indication is activated in the case of fully digitized areas. However, for fully digitized areas it may also be advantageous in some cases to activate the first direction indication in addition to the abstracted intersection representation.

If the current road is to be followed in conformity with the current navigation information, a straight-ahead arrow can be displayed in addition to the first direction indication.

Such a straight-ahead arrow informs the user that at present the navigation system does not have any instructions to change direction so that the user should continue to follow the present course of the road. In the case of ambiguous situations, for example, if a non-digitized junction occurs in a sharp curve, the user then knows how to proceed by following the first direction indication.

In the case of circular intersections with many junctions, orientation within the intersection on the basis of the second direction indication is often difficult. The first direction indication offers the driver an additional tool for finding the correct junction within the circular intersection.

The object of the invention in respect of a vehicle navigation system is achieved in that the arithmetic circuit is arranged to supply first direction information for a first direction indication to the output device, the output device is arranged to display the first direction indication which indicates the direct direction from the relevant instantaneous vehicle position to a remote point which is situated a forward distance therefrom along the route.

The arithmetic circuit calculates the relevant instantaneous position of the vehicle by means of the sensor signal. The arithmetic circuit determines, in dependence on said instantaneous position of the vehicle, a remote point which is situated along the planned route a forward distance from the instantaneous vehicle position in the travel direction. The arithmetic circuit then calculates the first direction as the first direction information, i.e. the direction of a straight line from the instantaneous vehicle position to the remote point. The arithmetic circuit applies this first direction information to the output device which optically displays the first direction indication.

The arithmetic circuit in an attractive embodiment of the navigation system is arranged to vary the forward distance. Variation of the forward distance enables adaptation of the forward distance to different parameters, for example vehicle parameters, parameters of the surroundings, and road parameters, and hence optimization of the first direction indication for the user.

The optimum value of the forward distance is highly dependent on the relevant course of the road and can be adjusted by automatic software-based adaptation of the forward distance in the arithmetic circuit. For example, the respective angles of the first direction indication can be stored in a memory at selectable intervals, said angles being evaluated by the arithmetic circuit. If the angular difference between two individual, successive angles exceeds a selectable limit value, the arithmetic circuit automatically reduces the forward distance. Furthermore, it is also advantageous when in the arithmetic circuit a pattern recognition algorithm is implemented which automatically utilizes selectable forward distances, for example stored in a memory of the navigation system, upon recognition of selectable intersection geometries. Another possibility consists in that the map information stored in a map storage unit of the navigation system contains the respective optimum forward distances for selectable intersections or road courses as additional information.

Furthermore, it is advantageous when a user can supply the arithmetic circuit with a selected value for the forward distance by means of an input device. Using such a selectable value, to be entered by the user, every driver can adapt the first direction indication to his or her individual requirements.

A combination of the first and the second direction indication offers the user a respective optimum direction indication in dependence on the map information contained in the map storage unit of the navigation system. The software of the arithmetic circuit automatically recognizes whether the map information for the relevant vehicle position, as supplied by the map storage unit, is present in partly digitized or in fully digitized form. If the data is present in partly digitized form, the arithmetic circuit preferably supplies the output device with the first direction information, the first direction indication then being reproduced by the output device, whereas the second direction indication is reproduced in the case of fully digitized surroundings. However, for fully digitized surroundings it may also be advantageous in some cases to reproduce, additionally to the abstracted intersection representation, the first direction indication by means of the output device.

The first direction indication can be very simply reproduced in the form of, for example a straight arrow or a compass needle. Therefore, the first direction indication can also be reproduced on low-resolution display screens, for example on monochrome display screens having a resolution of 64×120 pixels. Very inexpensive navigation systems can thus be realized. It is notably possible to provide a separate display on the steering wheel of the vehicle for the first direction indication. Such a display can be mounted quasi in the field of view of the driver. When such a display is used, the driver can very quickly pick up the first direction information without having to take his or her view from the road.

BRIEF DESCRIPTION OF THE DRAWINGS

Some embodiments of the invention will be described in detail hereinafter with reference to the FIGS. 1 to 7 of the accompanying diagrammatic drawing. Therein.

DESCRIPTION OF THE PREFERRED EMBODIMENTS

Figure 1:
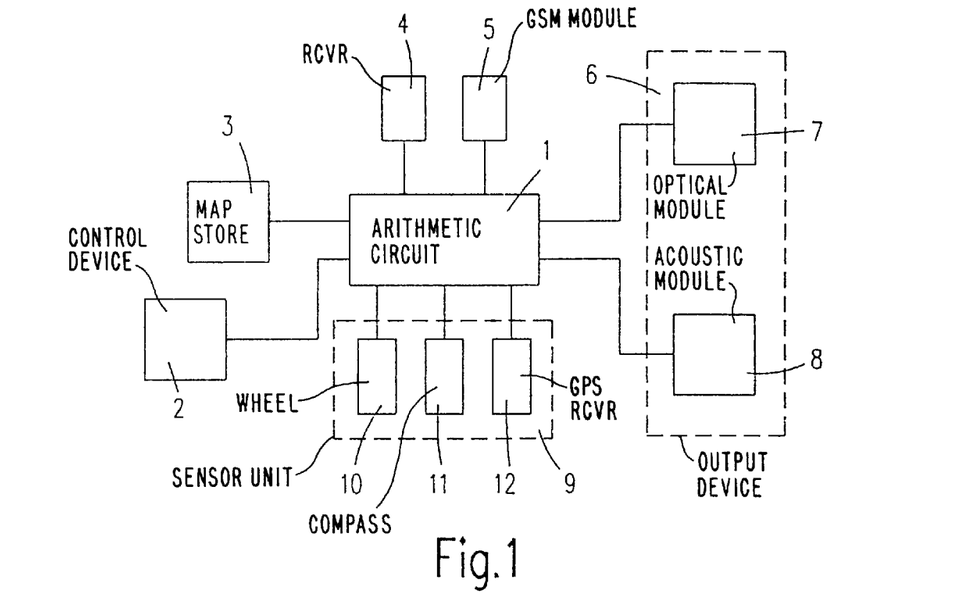
FIG. 1 shows a block diagram of a navigation system for a vehicle, including an arithmetic circuit and an output device for outputting direction information supplied by the arithmetic circuit, FIG. 2 diagrammatically illustrates the determination of a first direction indication with a travel route, a vehicle situated in an instantaneous vehicle position, a remote point which is situated along the travel route at a forward distance, and also the associated first direction indication.

FIG. 1 shows a block diagram of an embodiment of a navigation system according to the invention in which the method according to the invention is implemented. The central element of the navigation system shown in FIG. 1 is formed by an arithmetic circuit 1 which is coupled to a control device 2, a map storage unit 3, an RDS/TMC receiver 4 as well as to a GSM module 5. The control device 2 can be implemented, for example as a keyboard, a track ball or a touch screen. The map storage unit 3 can be implemented, for example as a CD-ROM player, the map information then being stored on one or more CD-ROMs. The RDS-TMC receiver 4 serves to receive traffic information. Via the GSM module, traffic information transmitted according to the GSM standard can be received and telephone calls can also be made.

There is provided an output device 6 which includes an optical output module 7 as well as an acoustic output module 8. The optical output module 7 and the acoustic output module 8 are both coupled to the arithmetic circuit 1. There is provided a sensor unit 9 which includes wheel sensors 10, an electronic compass 11 and a GPS receiving unit 12. The wheel sensors 10, the compass 11 and the GPS receiving unit 12 are all coupled to the arithmetic circuit 1. The wheel sensors 10 deliver information concerning the left wheel and the right wheel of the vehicle, i.e. either from the front wheels or from the rear wheels. The information of the wheel sensors, applied to the arithmetic circuit 1, concerns the distance travelled by the vehicle as well as changes of direction on the basis of different distances travelled by the left wheel and the right wheel. The electronic compass 11 applies angle information to the arithmetic circuit 1. The GPS receiving unit 12 supplies the arithmetic circuit 1 with position information concerning the instantaneous position of the vehicle. The arithmetic circuit 1 calculates the instantaneous position of the vehicle from the information from the map storage unit 3, the wheel sensors 10, the compass 11 and the GPS receiving unit 12. The arithmetic circuit 1 supplies the output device 6 with directional information in dependence on the instantaneous vehicle position, the output device 6 delivering the directional information to the driver in optical and/or acoustic form. It is possible to omit the GPS receiving unit 12 and to operate the navigation system exclusively with the map storage unit 3, the wheel sensor 10 and the compass 11.

Figure 2:
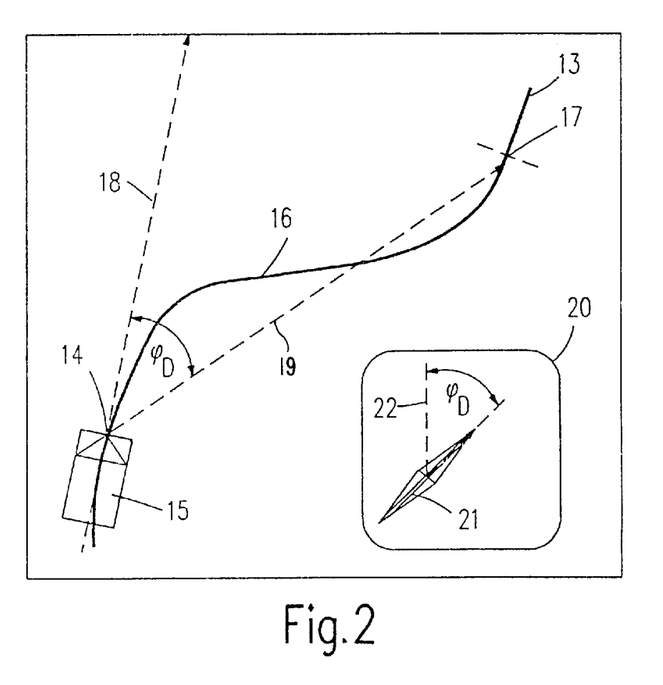

FIG. 2 shows a planned travel route 13 with a vehicle 15 present in an instantaneous vehicle position 14. A remote point 17 is situated along the travel route 13 at a forward distance 16 from the instantaneous vehicle position 14. An arrow 18, representing the longitudinal direction of the vehicle, extends in the direction of the longitudinal axis of the vehicle 15. An arrow 19, indicating the direction of the remote point, extends from the instantaneous vehicle position 14 to the remote point 17. The arrow 18, representing the longitudinal direction of the vehicle, and the arrow 19, indicating the direction of the remote point, enclose a remote point direction angle $\phi_D$ relative to one another. For this instantaneous vehicle position 14 and its associated remote point 17 there is provided a first direction indication 20 in the form of a compass needle 21. This first direction indication 20 is reproduced on the optical output module 7 of the output device 6 of FIG. 1. The compass needle 21 of the first direction indication 20 is inclined through the remote point direction angle $\phi_D$ with respect to the vertical direction 22.

The remote point direction angle $\phi_D$ is calculated by the arithmetic circuit 1 and applied to the output device 6 as first direction information.

Figure 3:
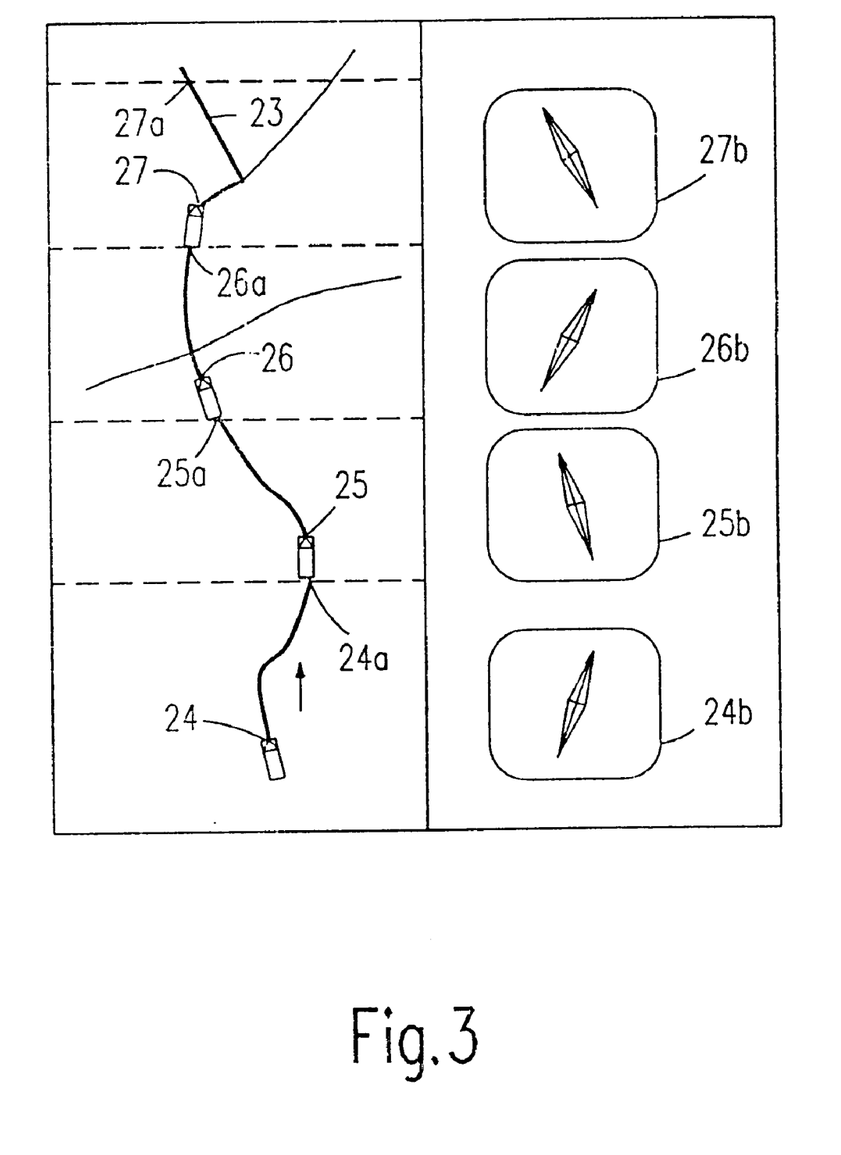
FIG. 3 shows a travel route with four instantaneous vehicle positions as well as the respective associated first direction indications.

FIG. 3 shows a travel route 23 with four different instantaneous vehicle positions 24, 25, 26 and 27 and the four remote points 24a, 25a, 26a and 27a, respectively, associated with these instantaneous vehicle positions. For each of the four individual instantaneous vehicle positions 24, 25, 26 and 27 there is shown the respective associated first direction indications 24b, 25b, 26b and 27b, respectively.

Figure 4:
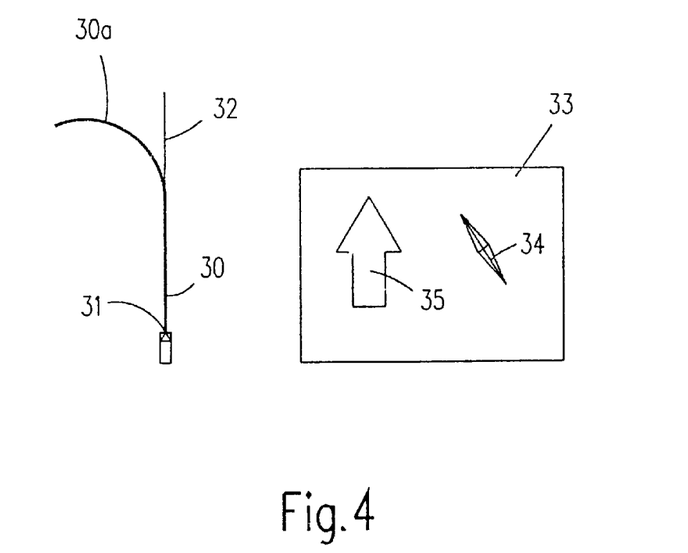
FIG. 4 shows a further example of a planned travel route with an instantaneous vehicle position and the first direction indication associated with the instantaneous vehicle position relating to a case where a non-digitized road turns off at a curve in the planned travel route.

FIG. 4 shows the course of a travel route 30 which includes a sharp curve 30a to the left. The vehicle is situated in the instantaneous vehicle position 31 preceding the left curve 30a. A secondary road 32 extends essentially straight ahead from the start of the sharp left curve 30a. This secondary road 32 is not digitized, i.e. no information concerning this secondary road 32 is present in the map storage unit 3 of FIG. 1, so that the map storage unit 3 of FIG. 1 cannot supply the arithmetic circuit 1 of FIG. 1 with information concerning this secondary road 32.

The instantaneous vehicle position 31 is associated with a display screen indication 33 which is intended to be displayed on the optical display module 7 of FIG. 1. The display screen indication 33 comprises a first direction indication 34 and a straight-ahead arrow 35 as a second direction indication. The straight-ahead arrow 35 informs the driver that there are no change of direction instructions due at present and that the driver should remain on the instantaneous road. Because the navigation system does not know the secondary road 32, the driver is not provided with an explicit acoustic instruction to drive to the left before the left curve 30a. On the basis of the first direction indication 34, however, the driver can ascertain that he or she should follow the left curve 30a and not continue straight ahead on the non-digitized secondary road 32.

Figure 5:
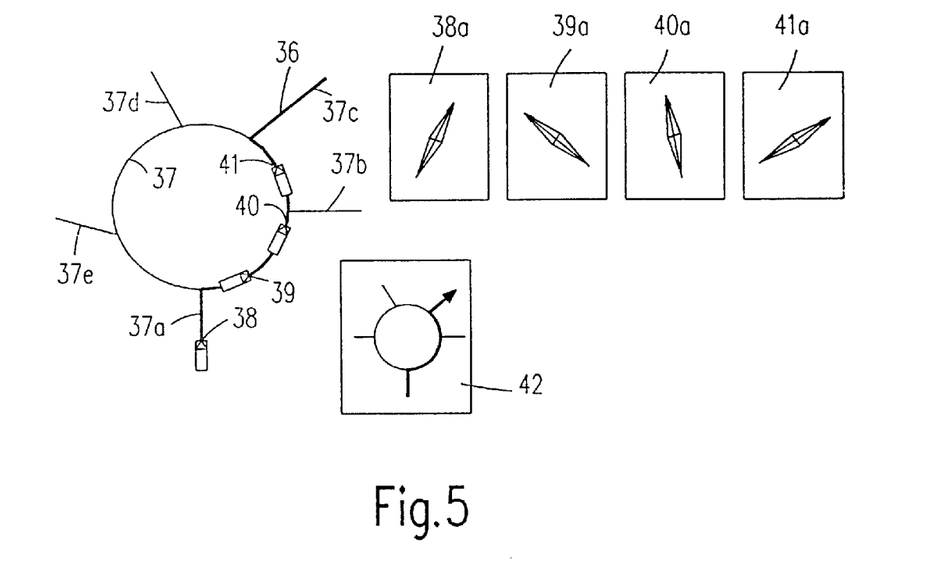
FIG. 5 shows a further example of a planned travel route with four instantaneous vehicle positions and the four first direction indications associated with the instantaneous vehicle positions, the planned travel route passing via a circular intersection with five junctions.

FIG. 5 shows a planned travel route 36 which includes a circular intersection 37 with five turn-offs 37a, 37b, 37c, 37d and 37e. FIG. 5 also shows four instantaneous vehicle positions 38, 39, 40 and 41. The first direction indications 38a, 39a, 40a and 41a are associated with the four instantaneous vehicle positions 38, 39, 40 and 41, respectively. In addition to the first direction indications 38a, 39a, 40a and 41a there is provided a second direction indication 42 which shows an abstracted representation of the circular intersection 37. The planned travel route is optically accentuated on this second direction indication 42. The second direction indication 42 does not change during the passage through the circular intersection 37 and is statically reproduced for all four instantaneous vehicle positions 38, 39, 40 and 41, whereas the first direction indications 38a, 39a, 40a and 41a are successively reproduced in conformity with the relevant instantaneous vehicle position. When a driver approaches the circular intersection 37, he or she can first get an impression of the circular intersection 37 ahead, via the second direction indication 42, and observe the planned route 36. When he or she subsequently enters the circular intersection 37, he or she can orientate him or herself on the basis of the respective instantaneous first direction indication 38a, 39a, 40a and 41a, and thus find the correct turn-off 37c.

Figure 6:
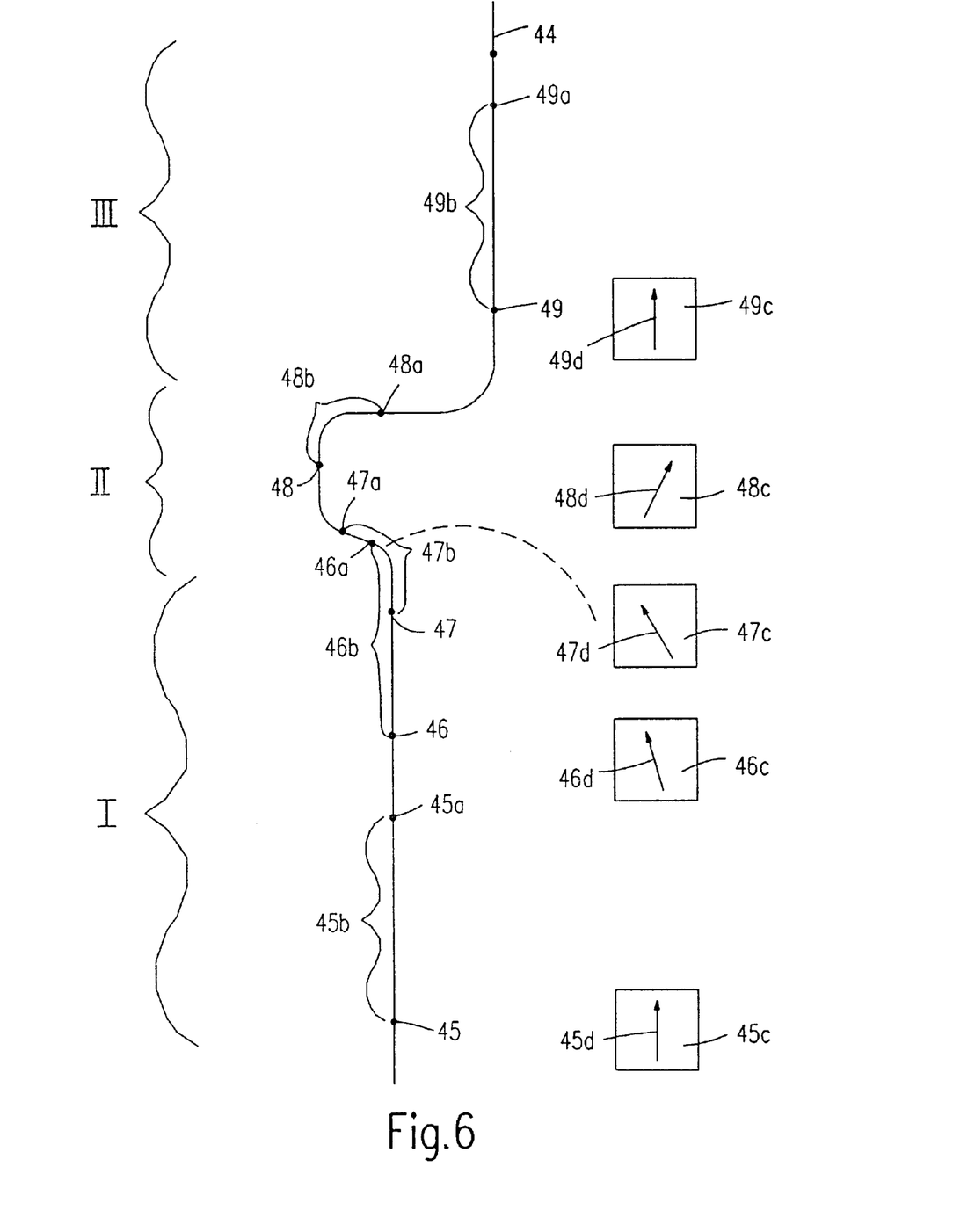
FIG. 6 shows a planned travel route which initially extends linearly, then comprises some curves and finally extends linearly again, the forward distance being decreased in dependence on the course of the road in the region in which the curves occur.

FIG. 6 shows a planned route 44 which first extends straight ahead over a segment I, subsequently comprises a few curves in an adjoining segment II and finally extends straight ahead again in a segment III. A variation of the forward distance which is dependent on the course of the road will be illustrated on the basis of the planned route 44. A vehicle (not shown) is initially present in the instantaneous vehicle position 45 at the start of the straight segment I. With this instantaneous vehicle position 45 there is associated a remote point 45a which is situated a forward distance 45 ahead of the instantaneous vehicle position 45 along the planned route 44. The instantaneous vehicle position 45 is associated with a first direction indication 45c with a directional arrow 45d pointing in the vertical direction. The forward distance 45b is a forward distance standard value which can be selected for the relevant type of road on the route 44, which value is stored, for example in a memory of the arithmetic unit 1. This forward distance standard value is used for the forward distance whenever the instantaneous road segment is essentially straight and the speed of the vehicle lies within a selectable speed range.

While following the route 44, the vehicle reaches the instantaneous vehicle position 46 with an associated remote point 46a which lies at a the forward distance 46b therefrom. The forward distance 46b is essentially equal to the forward distance 45b. The remote point 46a is situated at the start of a left curve. Accordingly, the directional arrow 46d of the first direction indication 46c, associated with the instantaneous vehicle position 46, points slightly to the left with respect to the vertical direction. The arithmetic circuit 1 recognizes this angular deviation from the vertical direction and subsequently reduces the forward distance automatically if the amount of the angular deviation exceeds a selectable limit value during a selectable minimum travel distance. This can be recognized on the basis of the instantaneous vehicle position 47 whose associated remote point 47a lies ahead at the forward distance 47b. The forward distance 47b has been automatically reduced by the arithmetic circuit 1 and amounts to only about half the forward distances 45b and 46b. The first direction indication 47c, associated with the instantaneous vehicle position 47, has a directional arrow 47d which is inclined approximately 45° relative to the vertical. Via this reduction of the forward distance, the driver can be appropriately informed of the curved course of the route 44 in the segment II by way of the first direction indication. During the selectable minimum travel distance, the arithmetic circuit 1 checks, continuously or at discrete intervals, whether the absolute values of the angular deviations with respect to the vertical direction are still beyond the selectable limit value. This is the case in the curved segment II of the route 44, so that the use of the small value for the forward distance is continued. For example, the remote point 48a associated with the instantaneous vehicle position 48 lies the forward distance 48b ahead of the instantaneous vehicle position 48. This forward distance 48b corresponds essentially to the forward distance 47b and amounts to only half the forward distances 45b and 46b. The directional arrow 48d of the first direction indication 48c associated with the instantaneous vehicle position 48 is inclined approximately 45° to the right with respect to the vertical direction. When the vehicle leaves the curved segment II and enters the straight segment III, the arithmetic circuit 1 of FIG. 1 detects that the first direction indication points in the vertical direction again and that the selectable limit value for the angular deviation is no longer exceeded. If the selectable limit value for the angular deviation is not exceeded during the selectable minimum travel distance, the forward distance is again increased to the selectable standard value for the relevant type of road. Thus, with the instantaneous vehicle position 49 there is associated the remote point 49a which lies the forward distance 49b ahead of the instantaneous vehicle position 49. The forward distance 49b corresponds to the forward distances 45b and 46b. The directional arrow 49d of the first direction indication 49c associated with the instantaneous vehicle position 49 points in the vertical direction.

Figure 7:
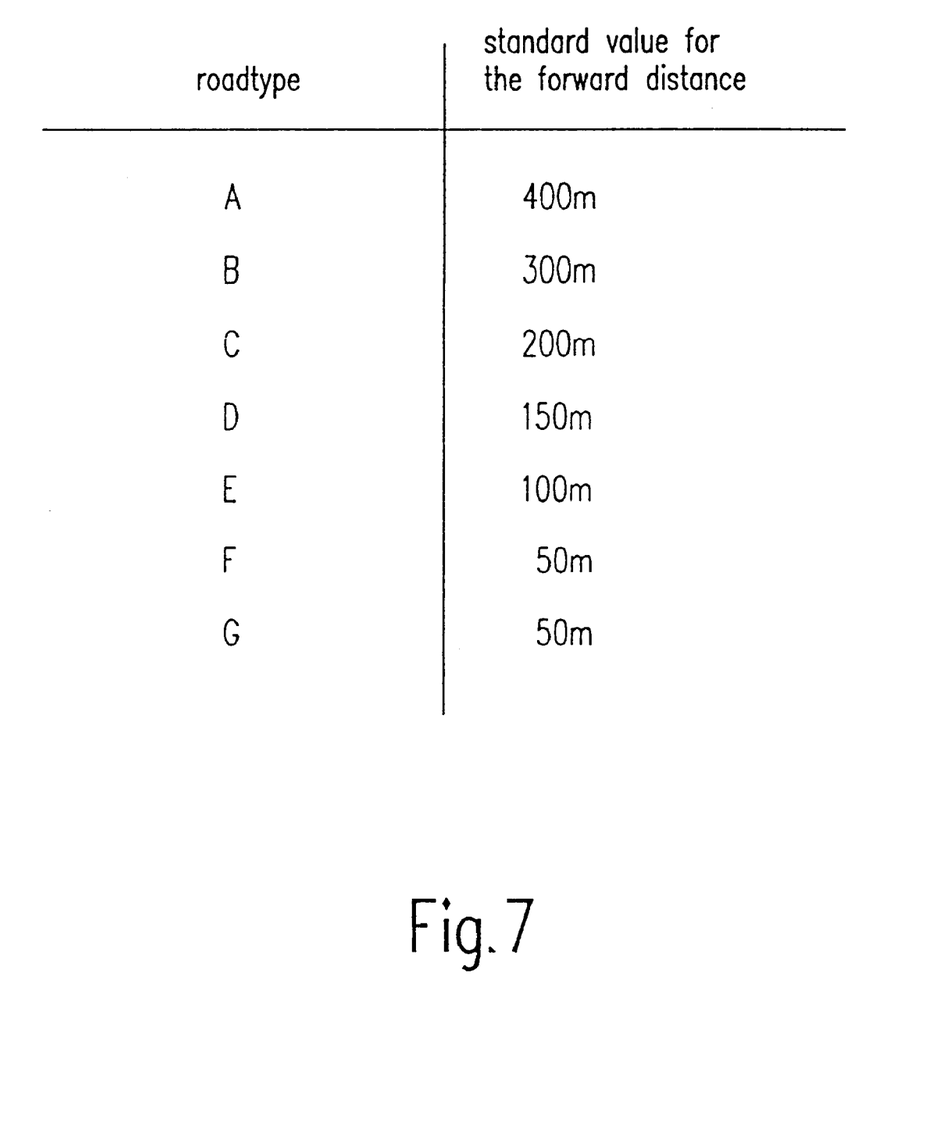
FIG. 7 shows a table with seven different types of road A to G with which a respective standard value in meters for the forward distance is associated.

FIG. 7 shows a table with seven different types of road A to G with which a respective standard value for the forward distance in meters is associated. The types of road A to G are classified according to average speed to be expected and are assigned to the respective roads stored in the map storage unit 3 of FIG. 1. The type of road A represents motorways, the type of road B represents state highways, the type of road C represents rural roads of high quality, the type of road D represents rural roads of average quality, the type of road E represents rural roads of low quality, and the road types F and G represent urban roads.

The standard values for the forward distances associated with the respective road types A to G are advantageously used when the instantaneous course of the road is straight ahead and the speed of the vehicle is within a selectable standard speed range. If the speed of the vehicle is higher, it will be detected by the arithmetic circuit 1 of FIG. 1 on the basis of the speed information applied to the arithmetic circuit 1, and the value for the forward distance will then be continuously or intermittently increased to a maximum value. If the speed of the vehicle is below the normal speed range, the forward distance will be continuously or intermittently reduced to a selectable minimum value. In addition to the speed-dependent variation of the standard value for the forward distance, it is advantageous to provide a variation of the standard value of the forward distance which is dependent on the course of the road, as has already been described with reference to FIG. 6.

What is claimed is:

1. A method of supplying direction information for guiding a vehicle to follow a planned route in a given navigation system, comprising the steps of:
   providing a first direction indication for moving from a given position to a remote point situated a preselected forward distance from the given position along said route; and
   continuously providing subsequent direction indications for moving from successive positions along said route to respective further remote points at successive selected forward distances along said route, wherein the preselected forward distances are set based on one or more parameters including type of route, changes in route direction, and route surface condition.

2. A method as claimed in claim 1, wherein the preselected forward distances are set based on vehicle speed.

3. A method as claimed in claim 1, wherein said route is a road.

4. A method as claimed in claim 1, wherein the preselected forward distances are set based on lighting and visibility conditions along said route.

5. A method of supplying direction information for guiding a vehicle to follow a planned route in a given navigation system, comprising the steps of:
   providing a first direction indication for moving from a given position to a remote point situated a preselected forward distance from the given position along said route; and
   continuously providing subsequent direction indications for moving from successive positions along said route to respective further remote points at successive selected forward distances along said route, wherein the preselected forward distances are set based on one or more parameters including lighting and visibility conditions along said route.

6. A method of supplying direction information for guiding a vehicle to follow a planned route over a roadway in a given navigation system, comprising the steps of:
   providing a first direction indication for moving from a given position to a remote point situated a preselected forward distance from the given position along said route;
   providing a second direction indication which includes abstracted representations of intersections along said route; and
   continuously providing subsequent direction indications for moving from successive positions along said route to respective further remote points at successive selected forward distances along said route, wherein the first direction indication indicates if a current particular road is continued to be followed.

7. A method as claimed in claim 6, wherein the first and second direction indications can be simultaneously provided for selected kinds of vehicle routes, including circular interchanges having a succession of possible turn-offs.

8. A vehicle navigation system comprising:
   means for producing a sensor signal indicative of movement of said vehicle;
   an arithmetic circuit responsive to the sensor signal to determine vehicle position along a preselected route and producing direction information for guiding said vehicle to follow said route; and
   an output device for outputting the direction information produced by the arithmetic circuit; wherein:
   (i) the arithmetic circuit is adapted to supply first direction information for causing said output device to produce a first direction indication indicative of the direction from a present vehicle position to a remote point situated a selected forward distance from the present position along said route; and
   (ii) the arithmetic circuit is adapted to produce abstracted intersection representations containing a second direction indication, and to supply at least one of the first and the second direction indications for a given region to the output device, wherein the first direction indication indicates if a current particular route portion is continued to be followed;
   (iii) the output device is adapted to display said first and second direction indications.

* * * * *